United States Patent
Meier et al.

(10) Patent No.: US 11,176,364 B2
(45) Date of Patent: Nov. 16, 2021

(54) COMPUTING SYSTEM FOR EXTRACTION OF TEXTUAL ELEMENTS FROM A DOCUMENT

(71) Applicant: Hyland Software, Inc., Westlake, OH (US)

(72) Inventors: Ralph Meier, Freiburg (DE); Thorsten Wanschura, Oldenburg (DE); Johannes Hausmann, Corcelles (CH); Harry Urbschat, Oldenburg (DE)

(73) Assignee: HYLAND SOFTWARE, INC., Westlake, OH (US)

( * ) Notice: Subject to any disclaimer, the term of this patent is extended or adjusted under 35 U.S.C. 154(b) by 150 days.

(21) Appl. No.: 16/358,271

(22) Filed: Mar. 19, 2019

(65) Prior Publication Data

US 2020/0302166 A1  Sep. 24, 2020

(51) Int. Cl.
*G06K 9/00* (2006.01)
*G06K 9/20* (2006.01)
(Continued)

(52) U.S. Cl.
CPC ..... *G06K 9/00463* (2013.01); *G06K 9/00449* (2013.01); *G06K 9/2072* (2013.01); *G06K 9/6253* (2013.01); *G06K 9/72* (2013.01); *G06T 7/50* (2017.01); *G06T 7/70* (2017.01); *G06K 2209/01* (2013.01);
(Continued)

(58) Field of Classification Search
CPC . G06T 2207/30242; G06T 2207/30176; G06T 2207/10008; G06T 7/70; G06T 7/50; G06K 2209/01; G06K 9/00463; G06K 9/2072; G06K 9/72; G06K 9/6253; G06K 9/00449

See application file for complete search history.

(56) References Cited

U.S. PATENT DOCUMENTS 5,491,760 A * 2/1996 Withgott ............ G06K 9/72
                                                    382/177
5,950,196 A    9/1999 Pyreddy et al.
(Continued)

FOREIGN PATENT DOCUMENTS

JP    11-184894    7/2019

OTHER PUBLICATIONS

European Office Action issued in EP 97931718.7, dated Jul. 9, 2001.
(Continued)

*Primary Examiner* — Amara Abdi
(74) *Attorney, Agent, or Firm* — Medley, Behrens & Lewis, LLC

(57) ABSTRACT

Described herein are various technologies pertaining to text extraction from a document. A computing device receives the document. The document comprises computer-readable text and a layout, wherein the layout defines positions of the computer-readable text within a two-dimensional area represented by the document. Responsive to receiving the document, the computing device identifies at least one textual element in the computer-readable text based upon spatial factors between portions of the computer-readable text and contextual relationships between the portions of the computer-readable text. The computing device then outputs the at least one textual element.

20 Claims, 9 Drawing Sheets

(51) Int. Cl.
　　　*G06T 7/70* 　　　(2017.01)
　　　*G06K 9/72* 　　　(2006.01)
　　　*G06T 7/50* 　　　(2017.01)
　　　*G06K 9/62* 　　　(2006.01)

(52) U.S. Cl.
　　　CPC .............. *G06T 2207/10008* (2013.01); *G06T 2207/30176* (2013.01); *G06T 2207/30242* (2013.01)

(56) References Cited

U.S. PATENT DOCUMENTS

| | | | |
|---|---|---|---|
| 6,353,840 B2* | 3/2002 | Saito | G06K 9/00442 715/202 |
| 6,411,974 B1 | 6/2002 | Graham et al. | |
| 6,470,095 B2 | 10/2002 | Mahoney et al. | |
| 7,174,507 B2 | 2/2007 | Baudin et al. | |
| 8,073,838 B2 | 12/2011 | Shi et al. | |
| 8,832,108 B1* | 9/2014 | Sampson | G06K 9/00483 707/737 |
| 2002/0184188 A1 | 12/2002 | Mandyam et al. | |
| 2004/0167907 A1 | 8/2004 | Wakefield et al. | |
| 2006/0262352 A1* | 11/2006 | Hull | G06F 16/955 358/1.18 |
| 2014/0122479 A1* | 5/2014 | Panferov | G06F 3/0643 707/736 |
| 2014/0268246 A1* | 9/2014 | Ohguro | H04N 1/00506 358/403 |
| 2015/0379049 A1* | 12/2015 | Gao | G06F 40/169 707/804 |
| 2016/0042061 A1* | 2/2016 | Sengupta | G06F 40/284 707/738 |
| 2017/0161390 A1* | 6/2017 | Kavas | G06F 16/313 |
| 2018/0060287 A1* | 3/2018 | Srinivasan | G06F 40/169 |
| 2018/0342061 A1* | 11/2018 | Xiang | G06K 9/00463 |

OTHER PUBLICATIONS

European Office Action issued in EP 97931718.7, dated May 8, 2002.
International Search Report issued in International Application No. PCT/EP98/00932, dated Jul. 28, 1998.
Lapir, Gannady, "Non-Final Office Action from U.S. Appl. No. 10/362,027", dated Jun. 17, 2005, 9 pages.
International Search Report issued in International Application PCT/US02/27132 dated Nov. 12, 2002.
A. Krikelis et al., "Associative Processing and Processors" Computer, US, IEEE, Computer Society, Long Beach, CA, US, vol. 27, No. 11, Nov. 1, 1994, pp. 12-17, XP000483129.
International Search Report issued in related International Application No. PCT/EP01/09577, dated Nov. 5, 2003.
Motonobu Hattori, "Knowledge Processing System Using Multi-Module Associate Memory", IEEE, vol. 1, pp. 531-536, May 4-9, 1998.
International Search Report issued in International Application No. PCT/EP01/01132, dated May 30, 2001.
H. Saiga et al., "An OCR System for Business Cards", Proc. of teh 2nd Int. Conf. on Document Analysis and Recognition, Oct. 20-22, 1993, pp. 802-805, XP002142832.
Junliang Xue et al., "Destination Address Block Location on Handwritten Chinese Envelope", Proc. of the 5th Int. Conf. on Document Analysis and Recognition, Sep. 20-22, 1999, pp. 737-740, XP002142833.
Machine Translation of JP 11-184894.
Simon Berkovich et al., "Organization of Near Matching in Bit Attribute Matrix Applied to Associative Access Methods in Information Retrieval", Proc. of the 16th IASTED Int. Conf. Applied Informatics, Feb. 23-25, 1998, Garmisch-Partenkirchen, Germany.
European Office Action issued in Application No. 01127768.8, dated Sep. 10, 2008.

European Office Action issued in Application No. 01120429.4, dated Sep. 16, 2008.
D. Frietag, "Information Extraction from HTML: Application of a General Machine LEarning Approach", Proc. 15th National Conference on Artificial Intelligence (AAAI-98); Tenth Conference on Innovative Applications of Artificial Intelligence, Proc. of the 15th National Conf. on Artificial Intelligence, Madison, WI, USA, pp. 517-523, XP002197239, 1998, Menlo Park, CA, USA, AAAI Press/MIT Press, USA ISBN: 0-262-51098-7.
European Office Action issued in Application No. 01120429.4, dated Jun. 30, 2006.
European Office Action issued in Application No. 01120429.4, dated Apr. 23, 2004.
E. Appiani et al., "Automatic document classification and indexing in high-volume applications", International Journal an Document Anallysis and Recognition, Dec. 2001, Springer-Verlag, Germany, vol. 4, No. 2, pp. 69-83, XP002197240, ISSN: 1433-2833.
A. Ting et al., "Form recognition using linear structure", Pattern Recognition, Pergamon Press Inc., Elmsford, NY, USA, vol. 32, No. 4, Apr. 1999 (Apr. 1999), pp. 645-656, XP004157536, ISSN: 0031-3203.
"EAST Text Search Training", Jan. 2000.
European Search Report issued in European Office Action 01120429.4, dated Jul. 19, 2002.
International Search Report issued in International Application PCT/DE97/01441, dated Nov. 12, 1997.
Voorheas et al., "Vector Expansion in a Large Collection", NIST Special Publication, Gaithersburg, MD, US, pp. 343-351 (Mar. 1993).
M. Marchand et al., "A Convergence Theorem for Sequential Learning in Two Layer Perceptrons", Europhysics Letters, vol. 11, No. 6, Mar. 15, 1990 (Mar. 15, 1990), pp. 487-492.
F. Aurenhammer, "Veroni Diagrams—A Survey of a Fundamental Geometric Data Structure", ACM Computing Surveys, vol. 23, No. 3, Sep. 1991, pp. 345-405.
C. Reyes et al., "A Clustering Technique for a Random Data Classification", International Conference on Systems, Man and Cybernetics, IEEE, pp. 316-321, (Oct. 22, 1995).
International Search Report issued in PCT/EP00/03097, dated Sep. 14, 2000.
International Preliminary Examination Report issued in PCT/EP00/03097, dated Jul. 31, 2001.
Written Opinion issued in PCT/EP00/03097, dated Apr. 12, 2001.
Japanese Office Action issued in Japanese Application No. 203-522903, dated Jul. 29, 2008.
English language translation of Japanese Office Action issued in Japanese Application No. 203-522903, dated Jul. 29, 2008.
European Office Action issued in European Application No. 01 905 729.8, dated Nov. 22, 2007.
Foreign Office Action issued in EP 00117850.8, dated May 20, 2008.
Foreign Office Action issued in EP 00117850.8, dated Jul. 20, 2006.
EP Search Report issued in EP 00117850.8, dated Jun. 12, 2001.
International Notification issued in PCT/EP00/03097, dated May 30, 2001.
G. Lapir, "Use of Associative Access Method for Information Retrieval Systems", Proc. 23rd Pittsburg Conf. on Modeling & Simulation, 1992, pp. 951-958.
Witten et al., "Managing Gigabytes", Morgan kaufmann Publishers, Inc., San Francisco, CA, USA, pp. 128-142, (1999).
C.J. Date, "An Introduction to Database Systems, Sixth Edition", Addison-Wesley Publishing Company, pp. 52-65, (1995).
International Search Report for PCT/US00/23784, dated Oct. 26, 2000.
Australian Office Action issued in Australian application 2002331728, dated Nov. 16, 2006.
Australian Notice of Acceptance issued in Australian application 2002331728, dated Feb. 20, 2008.
Foreign Office Action issued in EP 01127768.8, dated Feb. 5, 2007.
Foreign Office Action issued in EP 01127768.8, dated Sep. 8, 2005.
Bo-ren Bai et al., "Syllable-Based Chinese Text/Spoken Document Retrieval using Text/Speech Queries", International Journal of

(56) References Cited

OTHER PUBLICATIONS

Patern Recognition and Artificial Intelligence, vol. 14, No. 5, pp. 603-616, XP-002209092, (2000).
Foreign Search Report issued in EP 01127768.8, dated Sep. 12, 2002.
European Search Report issued in EP 00103810.8, dated Aug. 1, 2000.
European Office Action issued in EP 00103810.8, dated May 23, 2002.
International Preliminary Examination Report issued in International Application No. PCT/DE97/01441, dated Jul. 21, 1998.
European Office Action issued in EP 00926837.6, dated Nov. 28, 2006.
European Office Action issued in EP 00926837.6, dated Oct. 11, 2007.
Australian Office Action issued in AU 2001282106, dated Jul. 18, 2006.
Australian Office Action issued in AU 2001233736 dated Aug. 26, 2005.
Australian Office Action issued in AU 2001233736 dated Aug. 23, 2006.

* cited by examiner

| TRANSCRIPT WINTER 2019 | | | |
|---|---|---|---|
| Name: Joe A. Smith | Address: 123 1ˢᵗ Street, APT. 101 Greentown, OH, 44233 | | |
| ID: 123456 | | | |
| CLASS NAME | CLASS ID | GRADE | CREDITS |
| Calculus I | MATH101 | A | 4.0 |
| Physics II | PHYS201 | A- | 4.0 |
| Chemistry I | CHEM101 | B+ | 4.0 |
| Biology I | BIO101 | A | 3.0 |

| | |
|---|---|
| Winter 2019 Credits: | 15.0 |
| Winter 2019 GPA: | 3.8 |
| Cumulative Credits: | 56.0 |
| Cumulative GPA: | 3.56 |

FIG. 2

TRANSCRIPT WINTER 2019 — 302

| Name: | Joe A. Smith | Address: 123 1st Street, APT. 101 |
|---|---|---|
| ID: 320 — 123456 | | Greentown, OH, 44233 |

| CLASS NAME | CLASS ID | GRADE | CREDITS |
|---|---|---|---|
| Calculus I | MATH101 | A | 4.0 |
| Physics II — 324 | PHYS201 | A- — 326 | 4.0 |
| Chemistry I | CHEM101 | B+ | 4.0 |
| Biology I | BIO101 | A | 3.0 |

328

| Winter 2019 Credits: | 15.0 |
|---|---|
| Winter 2019 GPA: | 3.8 |
| Cumulative Credits: | 56.0 |
| Cumulative GPA: | 3.56 — 322 |

304

- CHAIN LENGTH FIELD 306
- ALIGNMENT TYPE FIELD 308
- TOLERANCE FIELD 310
- GATHER TO NEXT FIELD 312
- COORDINATE TYPE FIELD 314
- COMPARATOR FIELD 316
- TRAIN CHAIN BUTTON 318

TRANSCRIPT WINTER 2019 — 302

| Name: | Joe A. Smith | Address: 123 1st Street, APT. 101 Greentown, OH, 44233 |
|---|---|---|
| ID: | 123456 | |

| CLASS NAME | CLASS ID | GRADE | CREDITS |
|---|---|---|---|
| Calculus I | MATH101 | A | 4.0 |
| Physics II | PHYS201 | A- | 4.0 |
| Chemistry I | CHEM101 | B+ | 4.0 |
| Biology I | BIO101 | A | 3.0 |

502

| CLASS ID | GRADE |
|---|---|
| MATH101 | A |
| PHYS201 | A- |
| CHEM101 | B+ |
| BIO101 | A |

304

- CHAIN LENGTH FIELD — 306
- ALIGNMENT TYPE FIELD — 308
- TOLERANCE FIELD — 310
- GATHER TO NEXT FIELD — 312
- COORDINATE TYPE FIELD — 314
- COMPARATOR FIELD — 316
- TRAIN CHAIN FIELD — 318

300

COMPUTING SYSTEM FOR EXTRACTION OF TEXTUAL ELEMENTS FROM A DOCUMENT

FIELD

This disclosure relates to computer-implemented text and character recognition systems and methods.

BACKGROUND

A computer-readable document comprises computer-readable text and a layout. The layout defines positions of the computer-readable text within a two-dimensional area represented by the document. Such a document may, for example, be a semi-structured document. The document may thus serve as a digital representation of a physical copy of the document while at the same time retaining certain characteristics (e.g., length, width) of the physical copy.

As documents comprise computer-readable text, a computing device may perform a search over computer-readable text in a document in order to identify and extract relevant textual elements in the text. The computing device may then save the textual elements in a format that is suitable for further data processing (e.g., as part of a data structure, as part of a spreadsheet, as an entry in a database). In one conventional approach for identifying and extracting textual elements from a document, the computing device performs regular expression matching in order to identify and extract the textual elements. In another conventional approach, the computing device utilizes a template in order to identify and extract the textual elements from the document. The template is based upon expected positions of the portions of the computer-readable text within the document.

Conventional text extraction techniques for documents suffer from various deficiencies. First, conventional techniques tend to be inflexible with respect to changes in content of a document. For instance, if a textual element in a type of document is changed from a first word to a second word and a corresponding regular expression is not modified to incorporate the change, the computing device that executes the regular expression may be unable to properly match the textual element in the text of the document. Second, conventional techniques also tend to be inflexible with respect to changes (both major and minor) in a layout of a document. For instance, if a position of the textual element in the document is changed and a corresponding template for the document is not modified to incorporate the change, the computing device that is to match the template to the text in the document may be unable to correctly capture the textual element in the text of the document. Generating new regular expressions and/or new templates each time a document is changed can be burdensome on resources of the computing device.

SUMMARY

The following is a brief summary of subject matter that is described in greater detail herein. This summary is not intended to be limiting as to the scope of the claims.

Described herein are various technologies pertaining to extraction of textual elements from a document. With more specificity, described herein is a textual extraction application that is configured to identify at least one textual element in a document based upon spatial factors between portions of computer-readable text in the document and contextual relationships between the portions of the computer-readable text.

In operation, a computing device that executes the textual extraction application receives a document comprising computer-readable text and a layout. The computer-readable text may include letters, numbers, punctuation, and/or mathematical symbols. The layout defines positions of the computer-readable text within a two-dimensional area represented by the document. The document may have a defined type, wherein the defined type is indicative of a purpose of the document. In an example, a defined type of a document may be an educational transcript, and as such, computer-readable text of the educational transcript may be indicative of classes taken by a student, credit hours received by the students for the classes, and grades that the student received in the classes. In a further example, portions of the computer-readable text and/or the layout of the document may not have been encountered previously by the textual extraction application.

Responsive to receiving the document, the textual extraction application identifies at least one textual element in the computer-readable text based upon spatial factors between portions of the computer-readable text in the document and contextual relationships between the portions of the computer-readable text. The spatial factors may include distances between the portions of the computer-readable text, angles between the portions of the computer-readable text and an axis of the document, and/or orderings between the portions of the computer-readable text. The textual extract application may calculate the spatial factors based upon the positions of the computer-readable text within the document. The contextual relationships are determined via at least one computer-implemented model. Exemplary contextual relationships include source to object, object to use, person to location, whole to part, and/or type to subtype.

In order to identify the at least one textual element, the textual extraction application provides the computer-readable text and the positions of the computer-readable text in the document as input to the at least one computer-implemented model. The at least one computer-implemented model has been generated based upon a plurality of documents having the defined type of the document, wherein at least some documents in the plurality of documents have varying layouts, varying areas, varying portions of computer-readable text, varying font types, varying lengths and widths, and/or varying font sizes. The at least one computer-implemented model outputs, based upon the input, a plurality of textual elements in the computer-readable text and scores assigned to the plurality of textual elements. The at least one textual element is included in the plurality of textual elements. The textual extraction application identifies the at least one textual element based on a score in the scores. The score is indicative of a likelihood that the at least one textual element represents relevant content in the document based upon defined criteria for the defined type of the document. The defined criteria may be received by the textual extraction application via input by a user of the computing device. In an example where the document is an educational transcript, the defined criteria may indicate that identifiers for mathematical classes taken by the student and grades for the mathematical classes are to be extracted from the educational transcript.

Responsive to identifying the at least one textual element, the textual extraction application outputs the at least one textual element. In an example, outputting the at least one textual element comprises causing the computing device to present the at least one textual element on a display. In another example, outputting the at least one textual element comprises causing the computing device to store the at least one textual element in a data structure that is suitable for further data processing.

The above-described technologies present various advantages over conventional computer-implemented text extraction techniques. First, the above-described technologies enable extraction of textual elements from a new document of a defined type that has different content (e.g., different identifiers to refer to the same content) than a previous document of the defined type, without having to resort to generating new regular expressions to account for the different content. Second, the above-described technologies enable extraction of textual elements of documents of the defined type that have varied layouts, without having to resort to generating new templates to account for the varied layouts. Thus, the above-described technologies reduce usage of computing resources of computing devices.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 illustrates an exemplary document.

FIG. 3 depicts an exemplary graphical user interface (GUI).

FIG. 5 depicts yet another exemplary GUI.

DETAILED DESCRIPTION

Figure 1:
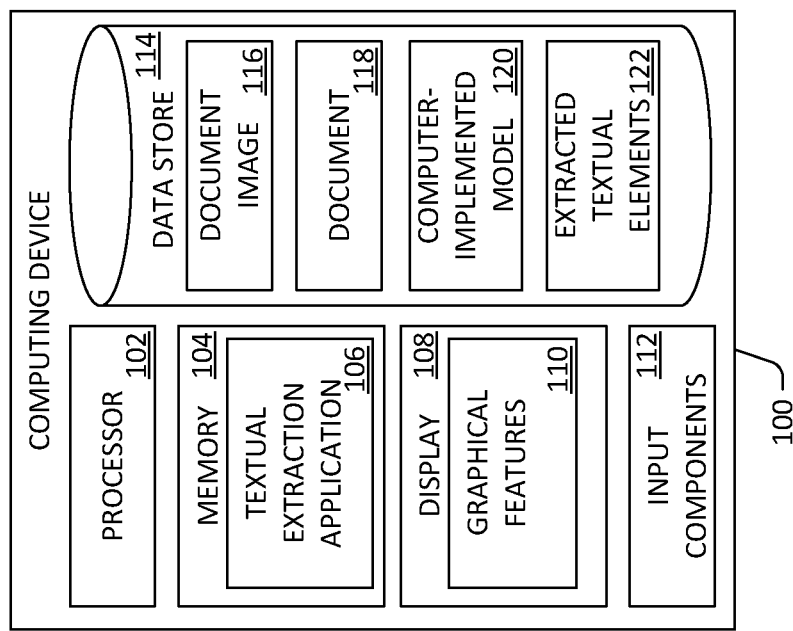
FIG. 1 is a functional block diagram of an exemplary computing device that facilitates extracting textual elements from computer-readable text of a document.

Various technologies pertaining to extraction of textual elements from computer-readable text of documents are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a," "an," and "the" as used in this application and the appended claims should generally be construed to mean "one or more" unless specified otherwise or clear from the context to be directed to a singular form. In additive, the term "including" should be construed as "including, without limitation."

Further, as used herein, the terms "component," "application," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference to FIG. 1, an exemplary computing device 100 that facilitates extracting textual elements from computer-readable text of a document is illustrated. The computing system 100 includes a processor 102 and memory 104, wherein the memory 104 has a textual extraction application 106 loaded therein. As will be described in greater detail below, the textual extraction application 106 (when executed by the processor 102) is configured to extract textual elements from computer-readable text of documents based upon spatial factors between different portions of the computer-readable text in the documents and contextual relationships between the different portions of the computer-readable text in the documents. In an embodiment, the textual extraction application 106 may also be configured to present a graphical user interface (GUI) that facilitates defining criteria for defined types of documents that is to be utilized by the textual extraction application 106 in extracting textual elements from the documents.

In an embodiment, the computing device 100 may be operated by a user. As such, the computing device 100 may comprise a display 108, whereupon graphical features 110 may be presented thereon. For instance, one or more GUIs (described below) may be presented on the display 108 as part of the graphical features 110.

Furthermore, the computing device 100 may additionally include input components 112 suitable for data input. For instance, the input components 112 may include a mouse, a keyboard, a touchscreen, a trackpad, a scroll wheel, a microphone, a camera, and/or a video camera.

The computing device 100 may include a data store 114. The data store 114 may store a document image 116. The document image 116 fails to include computer-readable text. More specifically, the document image 116 includes pixels that are indicative of text when presented on the display 108, but the text itself is not computer-readable and hence not searchable by the computing device 100. Exemplary file formats for the document image 116 include, but are not limited to, a non-searchable portable document format (PDF), a joint photographic experts group (JPEG), a JPEG file interchange format (JFIF), a tagged imaged file format (TIFF), a graphics interchange format (GIF), a windows bitmap (BMP), and/or a portable network graphics (PNG). Although the data store 114 has been depicted and described as storing a single document image, it is to be understood that the data store 114 may store many different document images. Moreover, the document images may have defined types (described in greater detail below).

In an embodiment, the computing device 100 may be in communication with a scanner (not shown). The scanner may generate the document image 116 by scanning a physical copy of a document.

The data store 114 also stores a document 118. The document 118 comprises computer-readable text (i.e., text that is searchable by the computing device 100) and a layout. The computer-readable text may include combinations of American Standard Code for Information Interchange (ASCII) characters and/or combinations of Unicode characters. For instance, the computer-readable text may include letters, numbers, punctuation, and/or mathematical symbols.

The layout defines positions of the computer-readable text within a two-dimensional area represented by the document 118. Thus, the document 118 has a length and a width. In a non-limiting example, the two-dimensional area may correspond to an A4 paper size, a letter paper size, or a legal paper size.

In an embodiment, the document 118 may be a tabular document such that the computer-readable text is arranged within one or more tables in the document 118. Thus, in the embodiment, the layout of the document 118 may define positions of the computer-readable text within the one or more tables.

It is to be understood that the document 118 may comprise one or more pages. It is also to be understood that different portions of the computer-readable text within the document 118 may be presented in different fonts (e.g., Times New Roman, Courier New) and/or different font sizes (e.g., 12-point font, 14-point font). For instance, a first portion of the computer-readable text may be presented in a first font, whereas a second portion of the computer-readable text may be presented in a second font. The first portion may be presented in 12-point font, whereas the second portion may be presented in 14-point font. Furthermore, it is to be understood that some portions of the computer-readable text within the document 118 may have typographical emphasis applied thereto. The typographical emphasis may include bold, underline, and/or italics.

The document 118 may have a defined type, wherein the defined type is indicative of a purpose of the document 118, and it should be understood that various documents with a specified purpose have similar relevant content often in similar spatial formats. In an example, the defined type may be an educational transcript that conveys information relating to grades received by a student for classes completed by the student. In another example, the defined type may be a taxation form that includes financial information of an entity that is used in determining taxes incurred by the entity. In yet another example, the defined type may be an invoice for goods or services. In a further example, the defined type may be a medical record. In an additional example, the defined type may be a personnel record. Other defined types may include human resource related documents, financial documents, such as documents related to insurance and mortgages, business cards, identification documents, such as drivers' licenses or visa documents, ballot papers, trade documents, bills of lading, and/or bank statements. In such examples, there will be similar context and text, such as capital letters standing alone, e.g., A, B, C, D, or F, or with a plus or minus sign for a transcript, and numerical values near a side or bottom of a document for an invoice or tax form. While there are similarities in these documents, there are also substantial variations, e.g., in location and how the content is presented. These variations make errors in automatic reading and extraction of relevant information from such documents by a computing device a significant problem, which is addressed by the features disclosed herein.

In an embodiment, the computing device 100 (or another computing device) may generate the document 118 from the document image 116 by applying an optical character recognition (OCR) process to the document image 116. Exemplary file formats for the document 118 include, but are not limited to, a searchable PDF and/or a document format, such as .doc or .docx.

Although the data store 114 has been depicted and described as storing a single document (the document 118), it is to be understood that the data store 114 may store many different documents having varying areas, layouts, computer-readable text, fonts, font sizes, and/or typographical emphasis. Moreover, the many different documents may be of different defined types.

The data store 114 may further store a computer-implemented model 120 that may be executed by the textual extraction application 106 in order to extract relevant textual elements from the document 118. In an embodiment, the computer-implemented model 120 may be a computer-implemented machine learning model. The computer-implemented model 120 is generated based upon a plurality of documents having a defined type, wherein characteristics (described in greater detail below) of at least some documents in the plurality of documents vary. In general, the computer-implemented model 120 is configured to take, as input, computer-readable text from a document (e.g., the document 118) having a defined type and positions of the computer-readable text within the document. The computer-implemented model 120 is configured to output, based upon the input, a plurality of textual elements from the computer-readable text and a score that is assigned to each textual element in the plurality of textual elements. Each score in the scores is indicative of a likelihood that each textual element in the plurality of textual elements represents relevant content in the document based upon defined criteria (described in greater detail below) for the defined type of the document.

In an embodiment, the computer-implemented model 120 may be or include a predictive model. The predictive model may be or include a continuous bag-of words model, a skip-gram model, or a weighed n-gram differences model. In another embodiment, the computer-implemented model 120 may be or include a count-based model, such as a Latent Semantic Analysis (LSA) model. In an embodiment, the computer-implemented model 120 may incorporate t-distributed stochastic neighbor embedding (t-SNE) techniques.

In an embodiment, the computer-implemented model 120 may be or include a Bayesian hierarchical model, a random forest model, or a neural network model. When the computer-implemented model 120 is a neural network model, the neural network model may be or include an artificial neural network (ANN) model, a deep neural network (DNN) model, a convolutional neural network (CNN) model, a recurrent neural network (RNN) model, or another suitable neural network model.

In an example, the computer-implemented model 120 may comprise nodes and edges that couple nodes in the computer-implemented model 120. Each edge is assigned a learned weight, wherein the learned weight can be learned using a supervised, semi-supervised, or unsupervised learning procedure. Accordingly, for instance, a learned weight assigned to an edge can be influenced by characteristics of a plurality of documents of a defined type. For instance, the characteristics may include computer-readable text of the plurality of documents, positions of the computer-readable text within the plurality of documents, areas of the plurality of documents, lengths and widths of the plurality of documents, fonts of the plurality of documents, font sizes of the plurality of documents, and/or typographical emphasis within the plurality of documents. The computer-implemented model 120 may take, as input, computer-readable text from a document (e.g., the document 118) and positions of the computer-readable text within the document. The computer-implemented model 120 is configured to output, based upon the input and the learned weights, a plurality of textual elements and scores assigned to each textual element in the plurality of textual elements. Each score in the scores is indicative of a likelihood that each textual element in the plurality of textual elements represents relevant content in the document based upon defined criteria for the defined type of document.

Although the data store 114 has been depicted and described as storing a single computer-implemented model (the computer-implemented model 120), it is to be understood that the data store 114 may store many different computer-implemented models (and hence the computer-implemented model 120 may comprise multiple computer-implemented models). In an example, the data store 114 may include a first computer-implemented model that is configured to identify textual elements in the document 118 based upon spatial factors between portions of the computer-readable text in the document 118 and a second computer-implemented model that is configured to identify the textual elements in the document 118 based upon contextual relationships between the portions of the computer-readable text. The textual extraction application 106 may execute both the first computer-implemented model and the second computer-implemented model in order to identify textual elements in the document 118 that represent relevant content in the document 118.

The data store 114 may additionally store extracted textual elements 122 that the textual extraction application 106 has extracted from the document 118 (or from other documents). The extracted textual elements 122 may be stored in a data structure that is conducive to further data processing. For instance, the extracted textual elements 122 may be stored in a spreadsheet (e.g., an eXtensible Markup Language (XML) based spreadsheet) or in a comma separated value (CSV) structure. The extracted textual elements 122 may also be stored as one or more entries in a database.

Although the document image 116, the document 118, the computer-implemented model 120, and the extracted textual elements 122 are described and shown as being stored in the data store 114, it is to be understood that the document image 116, the document 118, the computer-implemented model 120, and/or the extracted textual elements 122 may also be retained in the memory 104 of the computing device 100.

Operation of the computing device 100 is now set forth. Prior to identifying at least one textual element from computer-readable text of a document having a defined type, the computing device 100 (or another computing device) generates the computer-implemented model 120 from a plurality of documents (i.e., a corpus), each document in the plurality of documents having a defined type (e.g., educational transcript). Each document in the plurality of documents comprises computer-readable text and a layout that defines positions of the computer-readable text within a two-dimensional area represented by each document. Characteristics of some documents in the plurality of documents may vary. For instance, the characteristics may include varying portions of computer-readable text, varying positions of the computer-readable text within each document in the plurality of documents, varying typographical emphasis of portions of the computer-readable text, varying areas, varying lengths and widths, varying font sizes of the portions of the computer-readable text, and/or varying font sizes of the portions of the computer-readable text. In a specific example, a first document in the plurality of documents may have a textual element located at a first position within the first document, while a second document in the plurality of documents may have the (same) textual element located at a second position within the second document. The computing device 100 may repeat this process for documents having different defined types in order to generate many different computer-implemented models for the different defined types of documents.

The computing device 100 may also receive an indication of defined criteria for defined type of document. For instance, the computing device 100 may receive the indication of the defined criteria as input from a user of the computing device 100. The textual extraction application 106 may utilize the defined criteria in order to identify relevant content in a document of the defined type. More specifically, the defined criteria may be incorporated into the computer-implemented model 120. In an example where the type of the document is an education transcript, the defined criteria may be an indication of a type of course (e.g., mathematics courses having an identifier of "MATHXXX", where XXX is a number) taken by a student and grades received by the student in the type of course. As will be described in greater detail below, the textual extraction application 106 may utilize the defined criteria to identity a textual element in the document 118 even when the textual element is not identical to the defined criteria. For example, the textual extraction application 106 may identify mathematics courses having an identifier of "MTHYYYY", where YYYY is a number, even when the textual extraction application 106 has not been explicitly configured to identify mathematics courses having the aforementioned identifier.

The textual extraction application 106 receives the document 118. In an example, the computing device 100 may receive the document 118 from a second computing device that is in network communication with the computing device 100. In another example, the computing device may access the document 118 from the data store 114. As described above, the document 118 comprises computer-readable text and a layout. The layout defines positions of the computer-readable text within a two-dimensional area represented by the document 118.

The textual extraction application 106 identifies at least one textual element in the computer-readable text based upon spatial factors between portions of the computer-readable text and contextual relationships between the portions of the computer-readable text. For instance, the textual extraction application 106 may identify the at least one textual element responsive to receiving the document 118. The spatial factors may be present in a variety of forms. In an example, the computer-readable text may include a first textual element and a second textual element. The first textual element may be a first word located at a first position within the document 118, whereas the second textual element may be a second word located at a second position within the document 118. The spatial factors may then include a distance between the first textual element and the second textual element. The distance may be expressed in a metric unit (e.g., centimeters, millimeters) or as a number of pixels from the first textual element to the second textual element. In an example, the distance may be 0.01 to 20 mm. For instance, the distance may be 0.1 to 10 mm, or 1 to 5 mm.

The spatial factors may additionally include an angle between the first location of the first textual element, the second location of the second textual element, and an axis of the document. For instance, the axis may be a horizontal axis (i.e., a top side of the document 118 or a bottom side of the document 118) of the document 118 or a vertical axis of the document 118 (i.e., a left side of the document 118 or a right side of the document 118). In an example, the angle may range from 0 to 180°. For instance, the angle may be 15 to 80°, or 30 to 45°. When the at least one textual element further includes a third textual element at a third location within the document 118, the angle may be calculated based upon an angle within a triangle formed between the first location of the first textual element, the second location of the second textual element, and the third location of the third textual element.

The spatial factors may also include an ordering between the first textual element and the second textual element within the document 118. More specifically, the ordering may be an indication of whether the textual element or the second textual element occurs first in the document 118. The ordering may account for a read order (e.g., left to right, right to left, top to bottom, bottom to top) of a language in which the document 118 is written. The spatial factors may also include a number of textual elements that occur between the first textual element and the second textual element.

As mentioned previously, the textual extraction application 106 may further identify the at least one textual element based upon contextual relationships between the portions of the computer-readable text. The contextual relationships may be determined via the computer-implemented model 120. Exemplary contextual relationships include, but are not limited to, source to object, object to use, person to location, whole to part, and/or type to subtype.

The textual extraction application 106 identifies the at least one textual element by providing the computer-readable text of the document 118 and the positions of the computer-readable text within the document 118 as input to the computer-implemented model 120. In an embodiment, the textual extraction application 106 calculates the spatial factors described above and provides the calculated spatial factors as input to the computer-implemented model 120 in addition to providing the computer-readable text and the positions of the computer-readable text within the document 118.

In an embodiment, the textual extraction application 106 may identify the at least one textual element in the computer-readable text based upon types of typographical emphasis of portions of the computer-readable text. For instance, a textual element may be scored higher if the textual element is bolded within the document 118. The textual extraction application 106 may provide indications of portions of the computer-readable text that have the typographical emphasis to the computer-implemented model 120. The plurality of textual elements and the scores output by the computer-implemented model 120 may thus be further based upon the typographical emphasis of the portions of computer-readable text.

In an embodiment, the textual extraction application 106 may identify the at least one textual element in the computer-readable text based upon font types and/or font sizes of the computer-readable text in the document 118. The textual extraction application 106 may provide indications of the font types and/or the font sizes of the computer-readable text to the computer-implemented model 120. The plurality of textual elements and the scores output by the computer-implemented model 120 may thus be further based upon the font types and/or font sizes of the computer-readable text.

It is to be understood that the at least one textual element identified by the textual extraction application 106 may vary in length and/or type. In an example, the at least one textual element may include a first textual element and a second textual element. The first textual element may be a word in the computer-readable text of the document 118, while the second textual element may be a number in the computer-readable text of the document 118. In another example, the first textual element may be indicative of an identifier for the defined criteria that is found within the computer-readable text of the document 118, while the second textual element may be a word that meets the defined criteria. In yet another example, the first textual element may include a first word and a second word, while the second textual element may include a third word.

In an embodiment, the textual extraction application 106 may calculate string metrics for portions of the computer-readable text in the document 118. For instance, the string metrics may include Levenshtein distance, Damerau-Levenshtein distance, longest common subsequence (LCS) distance, Hamming distance, and/or Jaro distance. The textual extraction application 106 may further identify the at least one textual element based upon the string metrics.

Responsive to identifying the at least one textual element, the textual extraction application 106 outputs the at least one textual element. In an example, the textual extraction application 106 may output the at least one textual element by presenting the at least one textual element as part of the graphical features 110 presented on the display 108 of the computing device 100. In another example, the textual extraction application 106 may output the at least one textual element by storing the at least one textual element in a data structure that is conducive to further data processing. For instance, the textual extraction application 106 may cause the at least one textual element to be stored in an eXtensible Markup Language (XML) file (e.g., an XML-based spreadsheet), in a comma separated value (CSV) file, or as an entry in a database. The textual extraction application 106 may store the at least one textual element from the document 118 as part of the extracted textual elements 122 stored in the data store 114.

Although the above-described processes have been described as identifying and extracting textual elements in a single document, it is to be understood that the textual extraction application 106 may identify and extract textual elements from many different documents. Moreover, the textual extraction application 106 may identify and extract textual elements from documents of different defined types. It is to be understood that the textual extraction application 106 (or another application) may update the computer-implemented model 120 when further documents of the defined type are received by the computing device 100.

In an embodiment, the textual extraction application 106 may be configured to classify a document of an unknown type. The textual extraction application 106 may provide the computer-implemented text and/or positions of the computer-readable text within the document to a computer-implemented model (e.g., one of the computer-implemented models described above). The computer-implemented model may then output a label, wherein the label is indicative of a type of the document.

The textual extraction application 106 may be advantageous in scenarios in which the document 118 is an updated version of a second (prior) document. The second document may comprise second computer-readable text and have a second layout defining second positions of the second computer-readable text within a second two-dimensional area represented by the second document. The second computer-readable text and/or the second layout may vary from the computer-readable text and the layout of the document 118, respectively. Through execution of the above-described processes, the textual extraction application 106 can correctly extract at least one textual element from the document 118 despite the fact that the textual extraction application 106 has not been explicitly configured to extract textual elements from the document 118.

It is to be understood that the aforementioned processes described above may be performed by more than one computing device. For instance, a server textual extraction application may execute on a server computing device and a client textual extraction application may execute on a client computing device that is in network communication with the server computing device. The client computing device may present an interface that enables a user to define criteria ("the defined criteria") for documents of a defined type, while the server computing device may execute computer-implemented models in order to identify the at least one textual element. The server computing device may then, for example, cause the at least one textual element to be stored as an entry in a database. The server computing device may also transmit the at least one textual element to the client computing device, whereupon the client computing device can present the at least one textual element on a display of the client computing device.

Referring now to FIG. 2, an exemplary document 200 that can be presented on a display of a computing device (e.g., as part of the graphical features 110 presented the display 108 of the computing device 100) is illustrated. In an example, the document 200 may be or include the document 118. As shown in FIG. 2, the document 200 has a defined type, that is, the document 200 is an educational transcript. As such, the document 200 includes a name of a student ("Joe A. Smith"), a unique identifier for the student ("123456"), an address of the student ("123 $1^{st}$ Street, APT. 101, Greentown, Ohio, 44233"), a list of classes completed by the student during Winter 2019 ("Calculus I, Physics II, Chemistry I, and Biology I"), identifiers for the classes ("MATH101, PHYS201, CHEM101, and BIO101"), grades received by the student for each of the classes ("A, A−, B+, and A"), and a number of credits for each class ("4.0, 4.0, 4.0, 3.0"). The transcript also includes a number of credits for Winter 2019 ("15.0"), a grade point average (GPA) for Winter 2019 ("3.8"), a cumulative amount of credits earned by the student ("56.0"), and a cumulative GPA for the student ("3.56").

Turning now to FIG. 3, an exemplary graphical user interface (GUI) 300 is illustrated. In an example, the GUI 300 may be presented as part of the graphical features 110 presented on the display 108 of the computing device 100. The GUI 300 includes a first pane 302 that displays a document. As shown in FIG. 3, the document 200 is displayed in the first pane 302.

The GUI 300 further includes a second pane 304. The second pane 304 includes a plurality of fields 306-316. Each field in the plurality of fields 306-316 is configured to receive input from a user that is indicative of defined criteria that may be used by the textual extraction application 106 in order to identify textual elements from documents of the defined type of the document 200.

The plurality of fields 306-316 may include a chain length field 306, an alignment type field 308, a tolerance field 310, a gather to next field 312, a coordinate type field 314, and/or a comparator field 316. The chain length field 306 enables a user to specify a number of textual elements that are to be extracted in a chain of textual elements. The alignment type field 308 enables a user to specify alignments (e.g., right-aligned, center-aligned, left-aligned, justified) that are to be utilized in extracting textual elements from a document. This adjusts the spatial target for the identified text, affecting the score for related text found in this area of an analyzed document. The tolerance field 310 enables a user to specify a level of relatedness of extracted textual elements. Put another way, the tolerance field 310 specifies a ratio of allowed differences between textual elements learned during a training process of the computer-implemented model 120 and textual elements that are extracted during operation of the textual extraction application 106. The differences may pertain to edit distances, either in normal textual space, format representation, or canonical textual representations. The differences may also pertain to word-semantic distances. When the tolerance field 310 is set to a high value, the textual extraction application 106 identifies a relatively greater number of less related textual elements. When the tolerance field 310 is set to a lower value, the textual extraction application 106 identifies a relatively fewer number of more related textual elements. In an embodiment, the tolerance field 310 may be configured to control for spatial factors between textual elements. For instance, in the embodiment, a greater value in the tolerance field 310 will allow for a greater distance and/or a greater angle between textual elements as compared to a lesser value in the tolerance field 310. The gather to next field 312 enables a user to specify a number of textual elements that are to be gathered adjacent to a textual element as part of a chain of textual elements. The gather to next field 312 may allow for an absolute number of words next to textual elements to be extracted, as well as a number of words within a relative distance (e.g., 40% of page width) between textual elements to be extracted, or a number of first or last words between textual elements to be extracted. The coordinate type field 314 enables a user to specify a coordinate system (e.g., cartesian coordinates, polar coordinates) that is to be utilized by the text extraction application 106. The comparator field 316 enables the user to specify a format of the defined criteria. For instance, the format may include string, integer, or decimal.

In an embodiment, textual elements shown in the document displayed in the first pane may be selected by a user. In an example, the GUI 300 may receive a selection of a first textual element 320 ("Name: Joe A. Smith") and a second textual element 322 ("Cumulative GPA: 3.56") by the user. As seen in FIG. 3, the first textual element 320 and the second textual element 322 may be marked with first visual indicia to indicate the selection within the GUI 300. In another example, the GUI 300 may receive a selection of a third textual element 324 ("MATH101") and a fourth textual element 326 ("A") by the user. The third textual element 324 and the fourth textual element 326 may be marked with second visual indicia to indicate the selection within the GUI 300. The third textual element 324 and the fourth textual element 326 may be within a distance range 328, for instance, as specified by the tolerance field 310. The textual extraction application 106 may utilize the selections of the textual elements 320-326 in generating the defined criteria. For instance, as "MATH101" and "A" have been selected, the defined criteria may include textual elements that match an introductory level math class and a grade for the introductory level math class, even if the textual elements corresponding to "MATH101" and/or "A" vary from document to document of the defined type of the document 200 (educational transcript). For instance, for a different education transcript in which "MATH101" is substituted with "MTH1001", the textual extraction application 106 (through use of the computer-implemented model 120) may identify textual "MTH1001" as a textual element that is to be extracted.

The GUI 300 may include a train chain button 318. When the GUI receives a selection of the train chain button 318, the textual extraction application 106 may generate the defined criteria based upon selections of textual elements within the document 200 displayed in the first pane 302 as well as contents of the plurality of fields 306-316.

Figure 4:
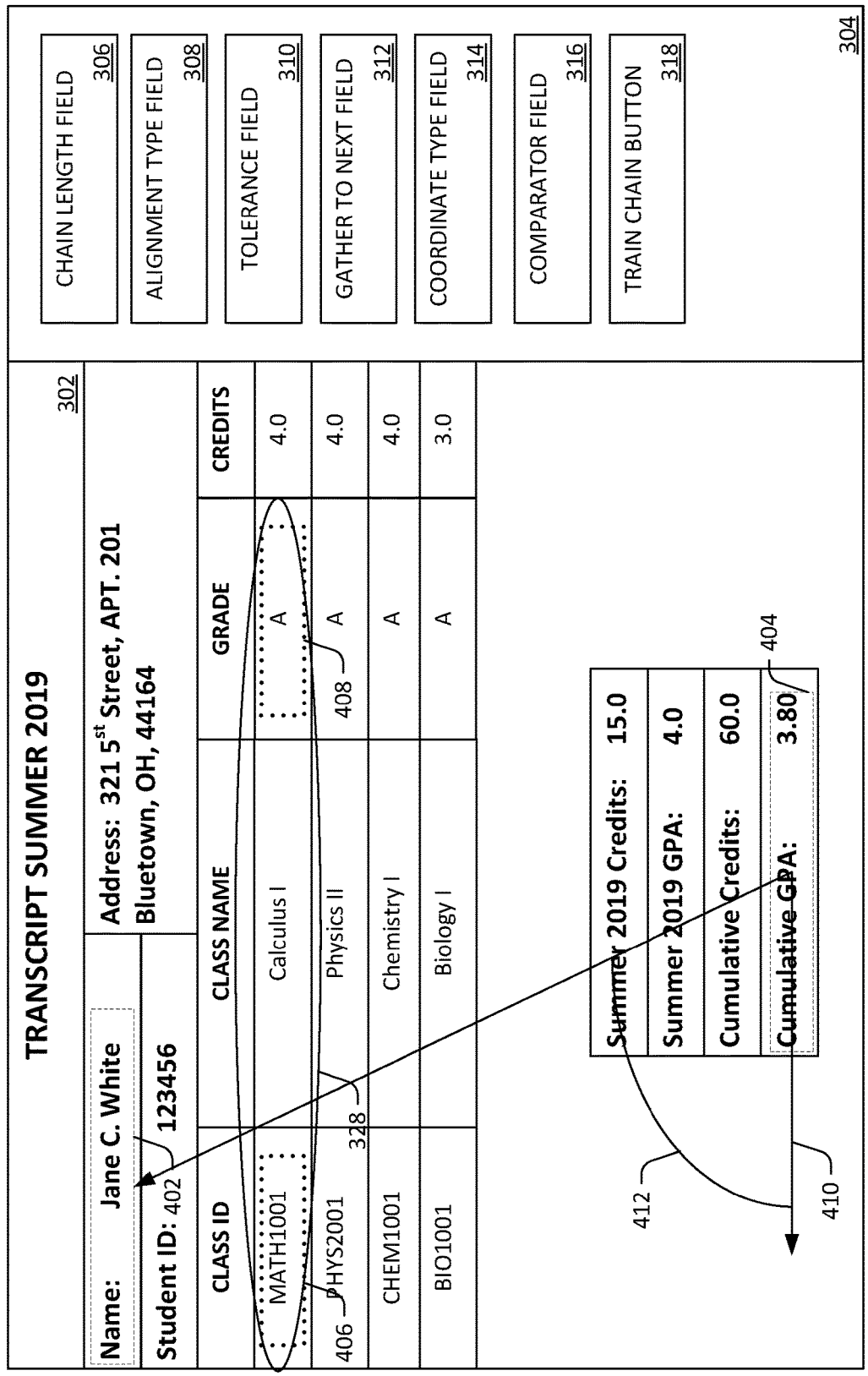
FIG. 4 depicts another exemplary GUI.

Turning now to FIG. 4, another view of the GUI 300 is illustrated. As shown in FIG. 4, a second educational transcript is shown in the first pane 302. Certain textual elements within the second educational transcript differ from the educational transcript shown in FIG. 3. For instance, the identifiers for the classes now comprise four digits instead of three as in FIG. 3. Additionally, positions of textual elements differ within the second transcript as compared to the educational transcript shown in FIG. 3.

As shown in FIG. 4, a fifth textual element 402 ("Jane C. White"), a sixth textual element 404 ("Cumulative GPA: 3.80"), a seventh textual element 406 ("MATH1001"), and an eighth textual element 408 ("A") have been selected by the textual extraction application 106 in accordance with the above-described processes and based upon the defined criteria described above.

In an example, the textual extraction application 106 may select the first textual element 402 and the second textual element 404 based upon an angle 412 between the first textual element 402, the second textual element 404, and an axis 410 despite the fact that the sixth textual element 404 is located at a different position than the second textual element shown in FIG. 3. In another example, the textual extraction application 106 may select the seventh textual element 406 and the eight textual element 408 as the seventh textual element 406 and the eight textual element 408 are within the distance range 328 described above. Notably, the textual extraction application 106 selects the seventh textual element 406 and the eight textual element 408 despite the fact that positions of the seventh textual element 406 and the eight textual element 408 are different from positions of the third textual element 324 and the fourth textual element 326, respectively, and despite the fact that the identifiers for the classes comprise four digits instead of three digits.

Referring now to FIG. 5, an updated view of the GUI 300 shown in FIG. 3 is illustrated. As shown in FIG. 5, the GUI 300 includes an extracted text field 502. The extracted text field 502 is configured to display textual elements that have been extracted from the document 200 (or that will be extracted from the document 200) shown in the first pane 302 based upon the defined criteria and output of the computer-implemented model 120. For instance, as shown in FIG. 5, the extracted text field 502 may display an identifier for each course in the document 200 and a grade received by the student for each course.

Figure 6:
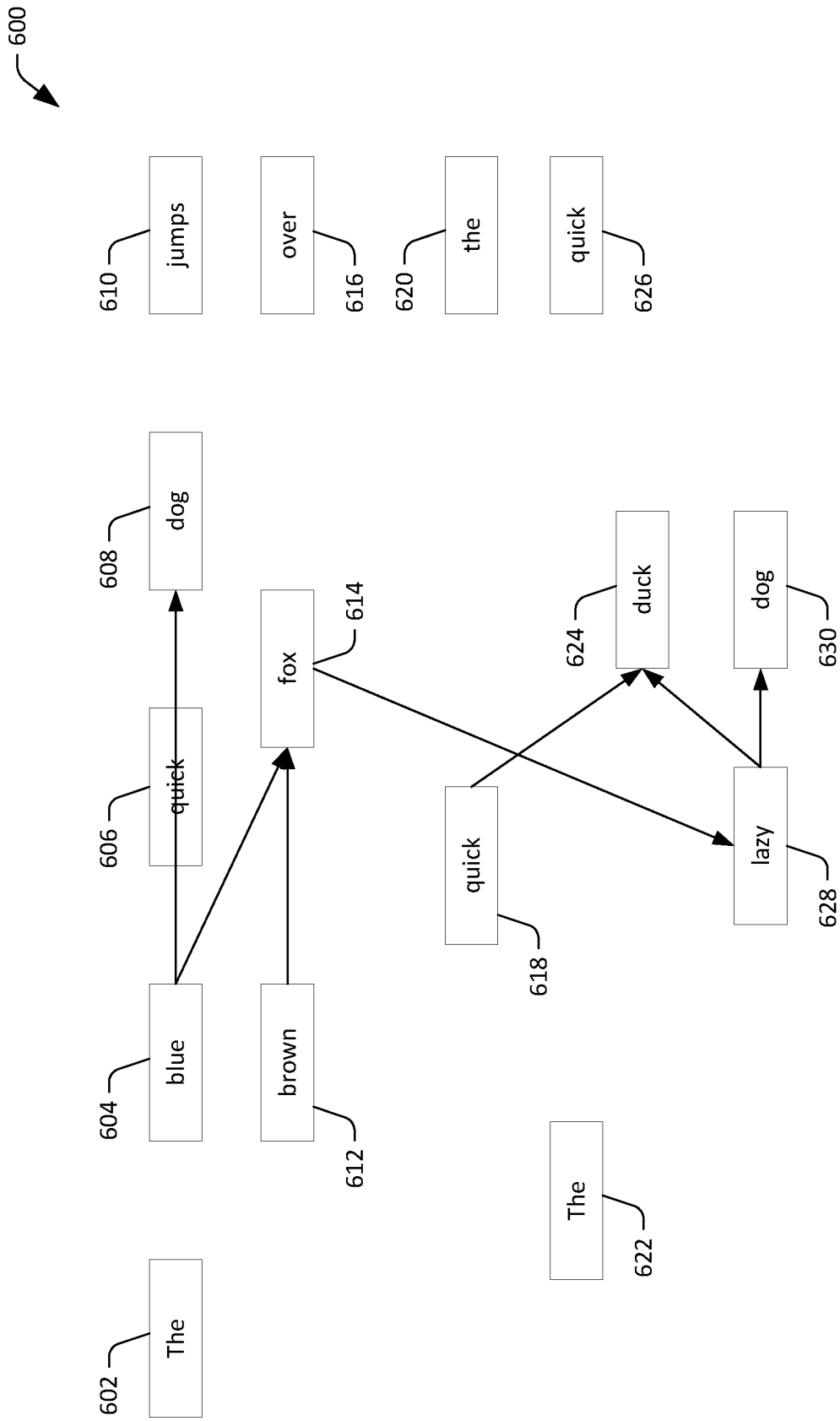
FIG. 6 depicts exemplary textual elements.

With reference now to FIG. 6, a view 600 of a plurality of textual elements 602-630 in a document is illustrated. The textual extraction application 106 described above may determine contextually relevant relationships between the plurality of textual elements 602-630 using the processes described above. In the view 600, textual elements in the plurality of textual elements 602-630 that have relevant relationships with one another are indicated by arrows. For instance, the textual extraction application 106 has determined that the textual element 612 ("brown") and the textual element 614 ("fox") have a contextually relevant relationship.

Figure 7:
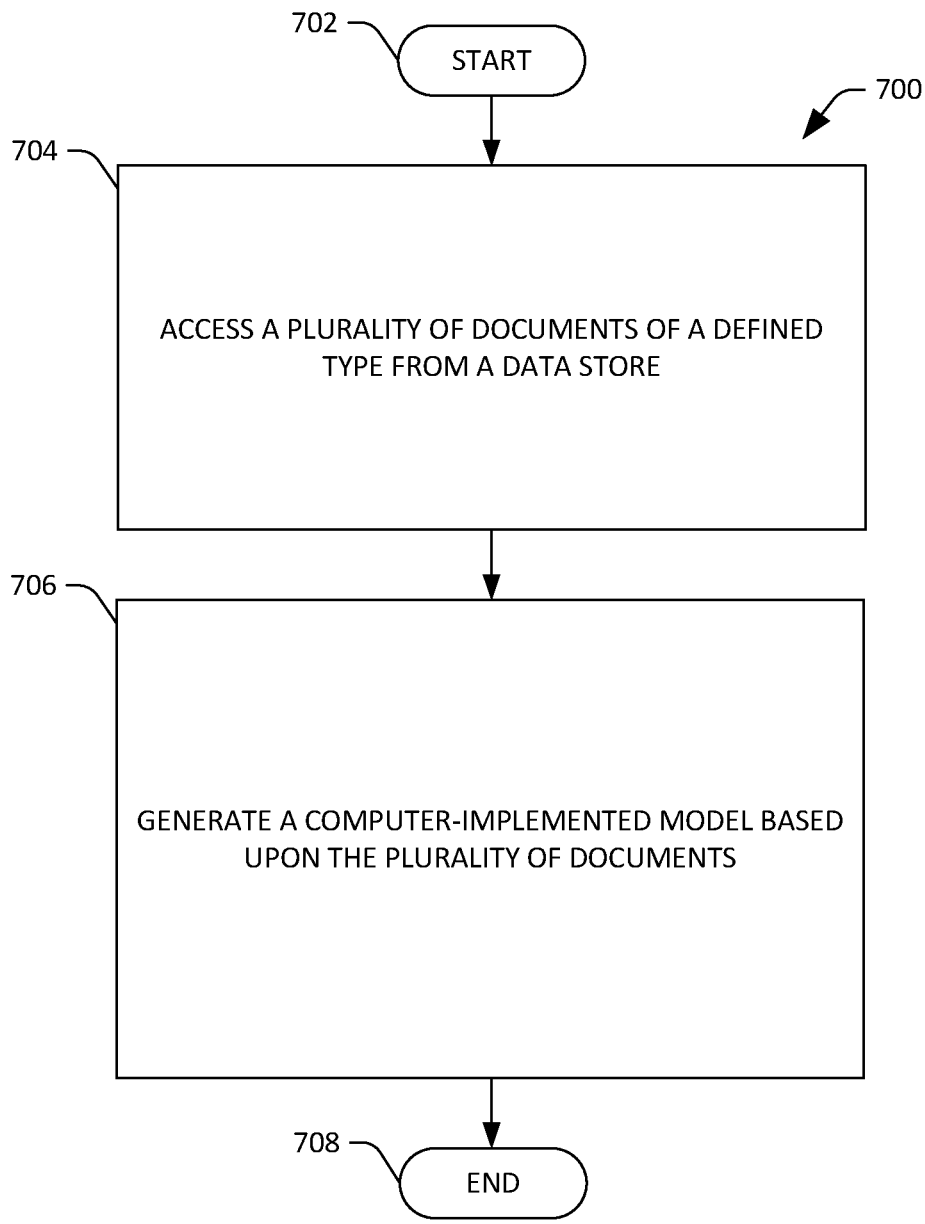
FIG. 7 is a flow diagram that illustrates an exemplary methodology executed by a computing device for generating a computer-implemented model.
Figure 8:
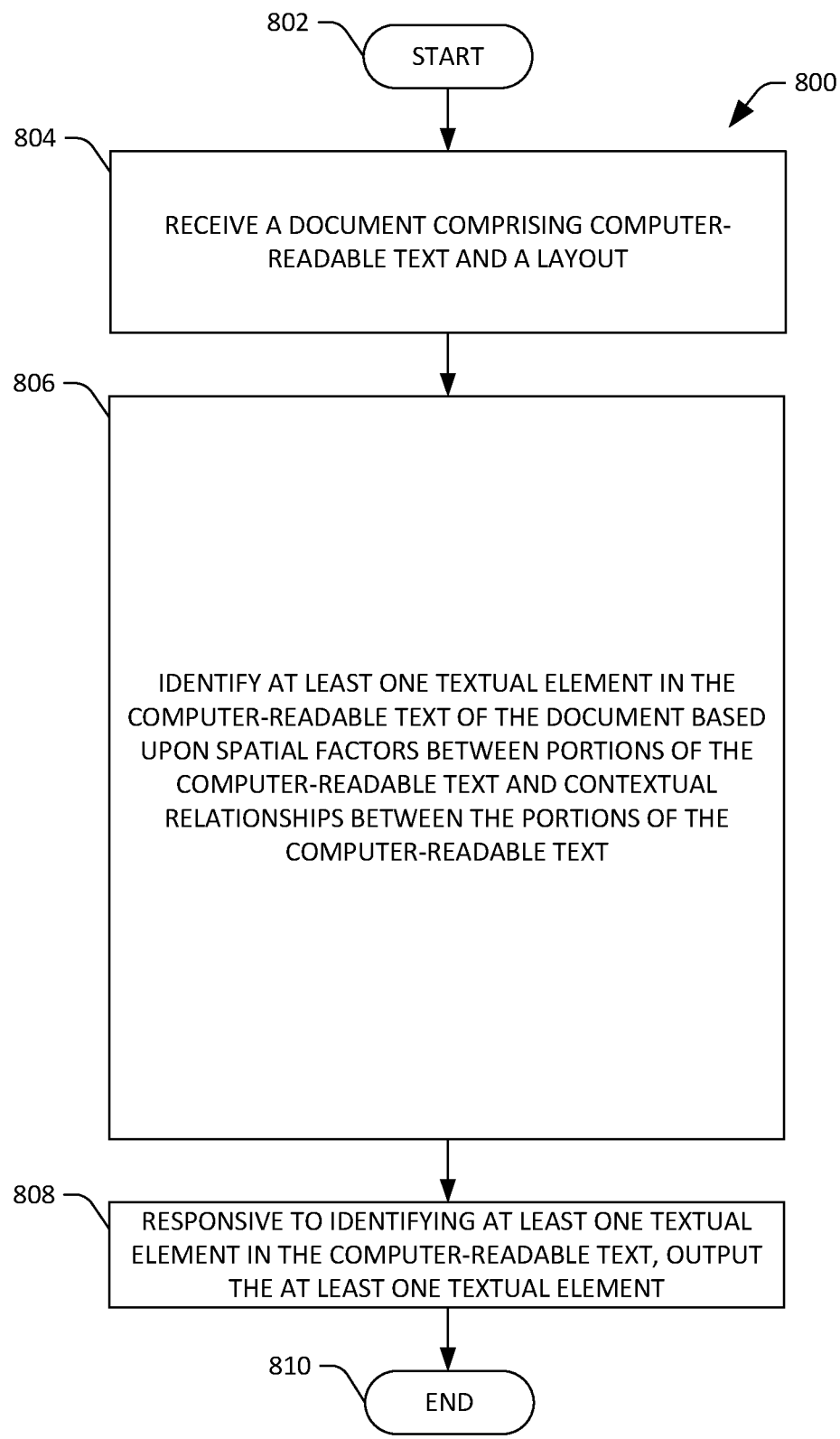
FIG. 8 is a flow diagram that illustrates an exemplary methodology executed by a computing device for extracting textual elements from computer-readable text of a document.

FIGS. 7 and 8 illustrate exemplary methodologies relating to extraction of textual elements from computer-readable text of documents. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, a methodology 700 executed by a computing device for generating a computer-implemented model is illustrated. The methodology 700 begins at 702, and at 704, the computing device accesses a plurality of documents of a defined type from a data store. Each document in the plurality of documents comprises computer-readable text and a layout that defines positions of the computer-readable text within a two-dimensional area represented by each document. At least some documents in the plurality of documents have characteristics that vary. The characteristics may include varying portions of computer-readable text, varying positions of the computer-readable text within the documents, varying typographical emphasis of portions of the computer-readable text, varying areas of the plurality of documents, varying lengths and widths of the plurality of documents, varying font types of the portions of the computer-readable text, and/or varying font sizes of the portions of the computer-readable text.

At 706, the computing device generates a computer-implemented model based upon the plurality of documents. The computer-implemented model is configured to take, as input, at least some of the characteristics described above from a document of the defined type. The computer-implemented model outputs, based upon the input, a plurality of textual elements in the document and scores assigned to the plurality of textual elements. A score in the scores is indicative of a likelihood that at least one textual element in the plurality of textual elements represents relevant content in the document based upon defined criteria for the defined type. The methodology 700 concludes at 708.

Turning now to FIG. 8, a methodology 800 executed by a computing device for extracting textual elements from computer-readable text of a document is illustrated. The methodology 800 begins at 802, and at 804, the computing device receives a document comprising computer-readable text and a layout. The layout defines positions of the computer-readable text within a two-dimensional area represented by the document.

At 806, the computing device identifies at least one textual element in the computer-readable text of the document based upon spatial factors between portions of the computer-readable text and contextual relationships between the portions of the computer-readable text. As such, the computing device provides the computer-readable text and the positions of the computer-readable text within the document as input to at least one computer-implemented model. The at least one computer-implemented model outputs, based upon the input, a plurality of textual element within the computer-readable text and scores assigned to the textual elements. The at least one textual element is included in the plurality of textual elements. The computing device identifies the at least textual element based on a score in the scores. The score is indicative of a likelihood that the at least one textual element represents relevant content in the document based upon defined criteria for a defined type of the document.

At 808, responsive to identifying the at least one textual element in the computer-readable text, the computing device outputs the at least one textual element. The methodology 800 concludes at 810.

Figure 9:
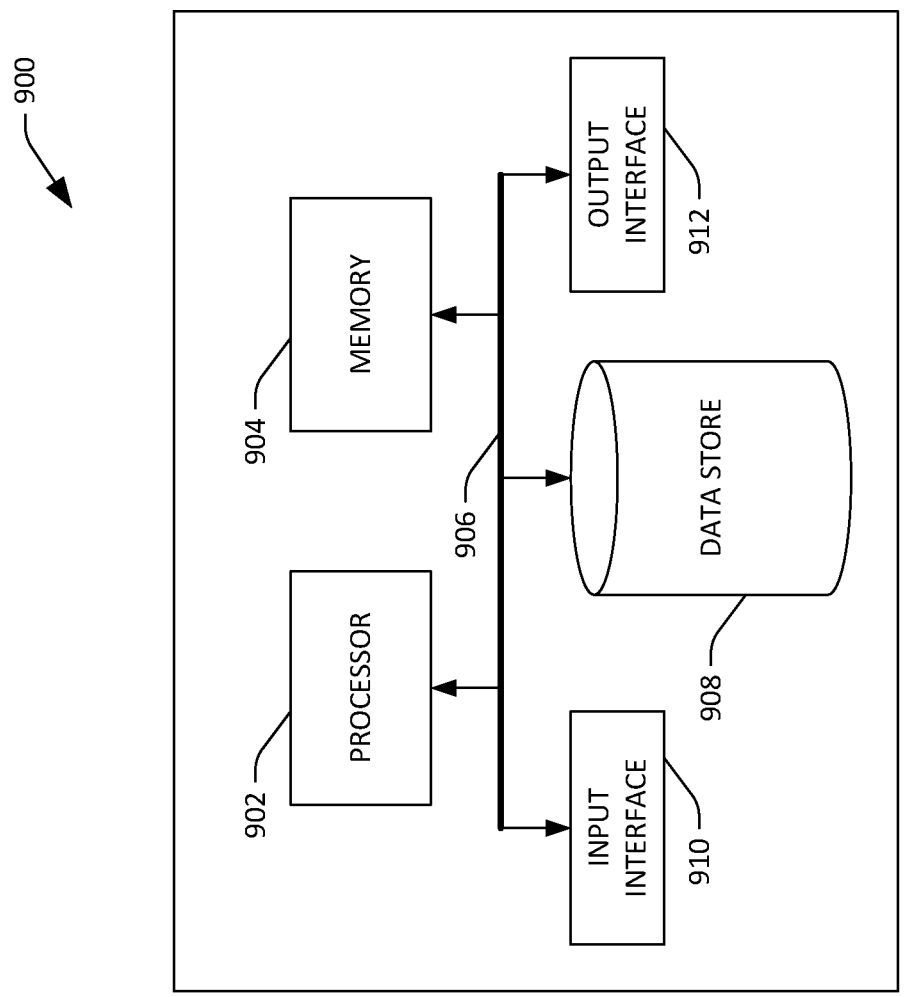
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that extracts textual elements from computer-readable text of a document. By way of another example, the computing device 900 can be used in a system that displays textual elements that have been extracted from computer-readable text of a document. The computing device 900 may thus be or include the computing device 100. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store document images, documents, computer-implemented models, extracted textual elements, etc.

The computing device 900 additionally includes a data store 908 that is accessible by the processor 902 by way of the system bus 906. The data store 908 may include executable instructions, document images, documents, computer-implemented models, extracted textual elements, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprising:
a processor; and
memory storing a textual extraction application, wherein the textual extraction application, when executed by the processor, causes the processor to perform acts comprising:
receiving a document comprising computer-readable text and a layout, wherein the layout defines positions of the computer-readable text within a two-dimensional area represented by the document;
responsive to receiving the document, identifying at least one textual element in the computer-readable text based upon:
spatial factors between portions of the computer-readable text in the document; and
contextual relationships between the portions of the computer-readable text,
wherein the textual extraction application provides the computer-readable text and the positions of the computer-readable text within the document as input to at least one computer-implemented model, wherein the at least one computer-implemented model outputs, based upon the input, a plurality of textual elements from the computer-readable text and scores assigned to the plurality of textual elements, the at least one textual element is included in the plurality of textual elements, wherein the at least one textual element is identified based on a score in the scores, wherein the score is indicative of a likelihood that the at least one textual element represents relevant content in the document based upon defined criteria for a defined type of the document, wherein the textual extraction application calculates the spatial factors between the portions of the computer-readable text based upon the positions of the computer-readable text within the document, wherein the textual extraction application provides the spatial factors as further input to the at least one computer-implemented model, wherein the scores are further based upon the spatial factors calculated by the textual extraction application; and
responsive to identifying the at least one textual element in the computer-readable text, outputting the at least one textual element.

2. The computing device of claim 1, wherein outputting the at least one textual element comprises presenting the at least one textual element on a display.

3. The computing device of claim 1, wherein outputting the at least one textual element comprises storing the at least one textual element in a data structure.

4. The computing device of claim 1, wherein the defined type of the document is one of:
an educational transcript;
an invoice;
a medical record;
a personnel record; or
a taxation form.

5. The computing device of claim 1, the acts further comprising:
prior to receiving the document, generating a document image of a physical copy of the document by scanning the physical copy of the document via a scanner that is in communication with the computing device, wherein the document image fails to include the computer-readable text; and
generating the document by applying an optical character recognition (OCR) process to the document image of the document.

6. The computing device of claim 1, the acts further comprising:
prior to identifying the at least one textual element in the computer-readable text, receiving the defined criteria as input from a user of the computing device.

7. The computing device of claim 1, wherein the computer-readable text comprises a first textual element and a second textual element, wherein the spatial factors include at least one of:
a distance between a location of the first textual element and a location of the second textual element within the document;
an angle between the location of first textual element, the location of the second textual element, and an axis of the document;
an ordering of the first textual element and the second textual element within the document; or
a number of textual elements that occur between the first textual element and the second textual element.

8. The computing device of claim 7, wherein the distance is from 0.01 to 20 mm, wherein the angle is from 0 to 180°.

9. The computing device of claim 1, wherein the defined type is indicative of a purpose of the document, the acts further comprising:
prior to identifying the at least one textual element in the computer-readable text, generating the at least one computer-implemented model based upon a plurality of documents, wherein each document in the plurality of documents is of the defined type, wherein at least some computer-readable text varies between each document in the plurality of documents, wherein at least some positions of the computer-readable text vary between each document in the plurality of documents.

10. The computing device of claim 1, wherein the document further comprises a table, wherein the layout further defines the positions of the computer-readable text within the table.

11. The computing device of claim 1, wherein identifying the at least one textual element in the computer-readable text is further based upon typographical emphasis of the portions of the computer-readable text, wherein the input to the computer-implemented model further includes indications of the typographical emphasis of the portions of the computer-readable text, wherein the plurality of textual elements and the scores assigned to the plurality of textual elements are further based upon the typographical emphasis of the portions of the computer-readable text.

12. A method executed by a processor of a computing device while the processor executes a textual extraction application, the method comprising:
receiving a document comprising computer-readable text and a layout, wherein the layout defines positions of the computer-readable text within a two-dimensional area represented by the document;
identifying at least one textual element in the computer-readable text based upon:

spatial factors between portions of the computer-readable text in the document; and contextual relationships between the portions of the computer-readable text, wherein the textual extraction application provides the computer-readable text and the positions of the computer-readable text within the document as input to at least one computer-implemented model, wherein the at least one computer-implemented model outputs, based upon the input, a plurality of textual elements within the computer-readable text and scores assigned to the plurality of textual elements, the at least one textual element is included in the plurality of textual elements, wherein the at least one textual element is identified based on a score in the scores, wherein the score is indicative of a likelihood that the at least one textual element represents relevant content in the document based upon defined criteria for a defined type of the document, wherein the textual extraction application calculates the spatial factors between the portions of the computer-readable text based upon the positions of the computer-readable text within the document, wherein the textual extraction application provides the spatial factors as further input to the at least one computer-implemented model, wherein the scores are further based upon the spatial factors calculated by the textual extraction application; and responsive to identifying the at least one textual element in the computer-readable text, outputting the at least one textual element.

13. The method of claim 12, wherein the document is an updated version of a second document, wherein the second document comprises second computer-readable text and a second layout, the second layout defining second positions of the second computer-readable text within a second two-dimensional area represented by the second document, wherein the second layout varies from the layout of the document, wherein at least a portion of the second computer-readable text varies from the computer-readable text of the document.

14. The method of claim 12, wherein identifying the at least one textual element in the computer-readable text is further based upon font types of the portions of the computer-readable text, wherein the input to the computer-implemented model further includes indications of the font types of the portions of the computer-readable text, wherein the plurality of textual elements and the scores assigned to the plurality of textual elements are further based upon the font types of the portions of the computer-readable text.

15. The method of claim 12, wherein the at least one computer-implemented model is one of:
a weighted n-gram difference model;
a continuous bag of words model; or
a latent semantic analysis (LSA) model.

16. A non-transitory computer-readable storage medium comprising a textual extraction application that, when executed by a processor of a computing device, causes the processor to perform acts comprising:
receiving defined criteria for a defined type of a document, the document comprising computer-readable text and a layout, wherein the layout defines positions of the computer-readable text within a two-dimensional area represented by the document;

receiving the document from a second computing device that is in network communication with the computing device;

identifying at least one textual element in the computer-readable text based upon:
spatial factors between portions of the computer-readable text in the document; and contextual relationships between the portions of the computer-readable text, wherein the textual extraction application provides the computer-readable text and the positions of the computer-readable text within the document as input to a computer-implemented model, wherein the computer-implemented model outputs, based upon the input, a plurality of textual elements within the computer-readable text and scores assigned to the plurality of textual elements, the at least one textual element is included in the plurality of textual elements, wherein the at least one textual element is identified based on a score in the scores, wherein the score is indicative of a likelihood that the at least one textual element represents relevant content in the document based upon the defined criteria for the defined type of the document, wherein the textual extraction application calculates the spatial factors between the portions of the computer-readable text based upon the positions of the computer-readable text within the document, wherein the textual extraction application provides the spatial factors as further input to the at least one computer-implemented model, wherein the scores are further based upon the spatial factors calculated by the textual extraction application; and responsive to identifying the at least one textual element in the computer-readable text, outputting the at least one textual element.

17. The non-transitory computer-readable storage medium of claim 16, wherein the at least one textual element comprises a first textual element that is indicative of an identifier for the defined criteria and a second textual element that meets the defined criteria.

18. The non-transitory computer-readable storage medium of claim 16, wherein the at least one textual element comprises a first textual element and a second textual element, wherein the first textual element is a word, wherein the second textual element is a number.

19. The non-transitory computer-readable storage medium of claim 16, wherein outputting the at least one textual element comprises storing the at least one textual element as an entry in a database.

20. The non-transitory computer-readable storage medium of claim 16, wherein the defined type of the document is one of:
an educational transcript;
an invoice;
a medical record;
a personnel record; or
a taxation form.

* * * * *